United States Patent Office 2,740,744
Patented Apr. 3, 1956

2,740,744

METHOD OF PROTECTING SEEDS USING SHORT ALKYL CHAIN AMMONIUM HALIDES

Walter W. Abramitis, Downers Grove, Ill., Walter C. O'Kane, Durham, N. H., and James Harwood, Western Springs, Ill., assignors to Armour and Company, Chicago, Ill., a corporation of Illinois No Drawing. Application August 2, 1952,
Serial No. 302,404

11 Claims. (Cl. 167—38)

This invention relates to seed protectants, and more particularly to the use of tetraalkylammonium salts as seed protectants.

Seeds and young plants are subject to attack by certain soil-inhabiting organisms generally designated as fungi. Certain of these harmful fungi in the soil are more specifically designated as "damping off" organisms and as "post damping off" organisms. The damping off organisms attack the seed or seedling, while the post damping off organisms attack the emerged plant near the top of the soil. The problem of effectively combating these organisms is both serious and of long standing. Chemical treatment of seeds prior to planting has proven of considerable benefit, but the compositions heretofore used for this purpose leave much to be desired both from the standpoint of effectiveness and cost of treatment. Therefore, the search for better seed protectant compositions has actively continued.

It is therefore a general object of this invention to provide seed protectants which are more effective and less expensive than those which have heretofore been known. It is a further object of this invention to provide seed protectant compositions which function in a novel manner to protect the seeds. It is a still further object of this invention to provide a method for treating seeds with the novel protectant compositions of this invention. Further objects and advantages will become apparent as the specification proceeds.

This invention is based in part on the discovery that lower tetraalkylammonium salts are capable of protecting seeds against harmful soil fungi. Further discoveries underlying the present invention will subsequently be discussed.

The process of the present invention is applicable to a wide variety of seeds. Of course, the seeds must be viable or capable of germination. However, it will be understood that in a group of seeds treated, that a certain percentage will not be capable of germination, and that the treatment of such mixtures of viable and non-viable seeds is intended to be included within the scope of this invention. The method of this invention is particularly desirable for the protection of vegetable seeds, flower seeds, and grain seeds. Among the specific types of seeds which have been found to be effectively protected by the method of this invention are the following: celery, tomato, lettuce, millet, pea, cucumber, alfalfa, cabbage, beet, cantaloupe, carrot, clover, onion, radish, spinach, grass, tobacco, turnip, lima bean and corn. In general, the germination and emergence of seeds, such as those listed above, is greatly improved by the treating method of this invention as compared to the germination and emergence of untreated seeds. Furthermore, as compared with standard commercial seed protectants such as tetrachloro-p-benzoquinone, the seed protectants of this invention are of at least comparable effectiveness even though employed in much smaller quantities. A great majority of the seeds tested were found to be much more effectively protected by the compositions of this invention even though up to four times as much of the commercial seed protectant was employed as the compounds of the present invention.

As indicated above, this invention is based in part on the discovery that the lower tetraalkylammonium salts possess seed protectant properties. By "lower" is meant that each of the alkyl groups contain less than 9 carbon atoms. Preferably, however, the tetraalkylammonium salts for use as seed protectants should contain less than 5 carbon atoms in each of their alkyl groups. While the halide salts are preferred, many other salts can be employed. The seed protectant properties of the compositions of this invention are believed to reside primarily in the cationic portion of the molecule, that is, in the tetraalkylammonium ion. The anionic portion of the molecule is of lesser importance, except that in order to take advantage of the seed protectant properties of the cationic portion of the molecule, it is necessary that the cationic portion be relatively non-toxic to the seeds treated. A large number of inorganic cations fulfill these requirements in addition to the members of the halogen family. For example, phosphate, sulfate, and nitrate salts can be employed. In addition, organic anions may be used. In particular, fatty acid salts are desirable, including lower fatty acid salts such as acetate salts and higher fatty acid salts such as stearate salts. Specific preferred salts are chloride and bromide salts, and specific preferred compounds are tetramethylammonium chloride, tetramethylammonium bromide, trimethylethylammonium chloride, and trimethylethylammonium bromide.

Various techniques can be employed for treating seeds with the seed protectant compounds of this invention. One excellent method of treatment is to dissolve the compounds in a liquid carrier, and then contact the seeds with the solution thus formed. While aqueous treating solutions are preferred, other solvents can be employed which are not harmful to the seeds, such as the lower alcohols (ethanol) and the lower ketones (acetone). The concentration of the treating solution is not particularly critical and can be varied within rather wide limits. For example, substantially saturated treating solutions might be employed. When aqueous solutions are employed at least 1% concentrations, and preferably at least 2.5% concentrations are desirable. Excellent results are obtained with concentrations from about 5 to 10%, although much higher concentrations up to the limit of the solubility of the compounds can be employed. However, there does not appear to be any particular advantage in using very high concentrations.

The technique of treating the seeds with aqueous solutions of the compounds is very simple, since only a short contact time is required. In fact, satisfactory results can be obtained by merely dipping the seeds in the treating solution, and immediately thereafter removing the seeds therefrom. In other words, depending somewhat on the concentration of the solution, effective protection of the seeds may be obtained with contact times as short as 10 to 20 seconds, although contact times of around 2 to 3 minutes are generally desirable to provide an assurance that maximum protection has been obtained. However, considerably longer contact times are not harmful, and can be used if desired. The temperature of the treatment has not been found to be critical, and treatments at room temperature (20 to 25° C.) are entirely satisfactory. After the seeds have been immersed in the treating solution, it is generally desirable to drain and dry the seeds. Depending somewhat on the concentration of the treating solution and the absorptiveness of the seeds, a film or coating of the protectant compounds will generally be visible on the outside of the treated and dried seeds.

Another excellent method of applying the protectant compounds is by distributing the solid compounds in a solid carrier and then contacting a mixture of the carrier and the protectant compounds with the seeds. Fairly good results can be obtained by directly contacting the seeds with the undiluted compounds. However, since a large number of the lower tetraalkylammonium salts are very hygroscopic and tend to be sticky or gummy, it is preferable to first mix them with a diluent or carrier, which facilitates the distribution of the protectant compound over and throughout the seeds. Standard inert carrier materials for insecticides, fungicides, etc. can be used for this purpose. For example, talc, clays, etc. may be used. The concentration of the protectant compounds in the carrier-protectant composition is not critical. For example, concentrations ranging from 10 to 50% are satisfactory. For practical purposes, concentrations of around 25% have been found to give excellent results.

Various techniques can be employed to promote an intimate contact between the solid seed protectants either alone or in admixture with a solid carrier. Various standard commercial contact apparatuses can be used within which the seeds are agitated or tumbled in contact with the protectant compositions. Generally, 5 to 10 minutes of tumbling or agitation is sufficient to obtain the maximum protection.

Some salts of the tetraalkylammonium halides are relatively non-sticky and free flowing. Therefore, these salts are particularly desirable when it is desired to treat the seeds with a solid protectant composition without employing a diluent or a carrier. In particular, the higher saturated fatty acid salts have this desirable property. Specifically desirable salts in this regard are palmitate and stearate salts, such as trimethylethylammonium palmitate or stearate, and tetramethylammonium palmitate or stearate.

It has also been found that the tetraalkylammonium salts tend to form complexes with bentonite clays. These complexes are actually salts and can be described as tetraalkylammonium bentonites. These bentonite complexes or salts also have the desirable property of being relatively non-sticky or free flowing, and are believed to have the further desirable property of promoting the adhesion of the compositions to the seeds, and thereby increasing the ease of coating the seeds.

After the contacting of the seeds with the solid protectant compositions, it is desirable to remove the excess protectant composition from the treated mass of seeds.

It has been found that after treating the seeds either with the solid protectant compositions or with solutions thereof that it is desirable to tumble the seeds for a short interval of time. It has been discovered that by tumbling the seeds for a short period of time that a considerably higher germination rate is achieved than with treated, untumbled seeds. The reasons for the value of the tumbling step are not fully understood. However, it is known that similar tumbling procedures do not noticeably increase the germination rate of untreated seeds. The desired effect can be obtained by tumbling the seeds either mechanically or by hand so that the mass of seeds is rotated or otherwise agitated in such a manner as to cause the seeds to roll over or rub against each other. Preferably, this tumbling action should not be so violent as to break the seed coats or otherwise damage the seeds. A gentle tumbling of from 1 to 2 hours has been found to give the desired result, although some benefit is achieved by tumbling times as short as 10 minutes.

The explanation for the value of the compositions of the compounds of this invention as seed protectants is not understood. The generally accepted basis for the selection of a seed protectant composition relates to the fungicidal properties of the composition. In fact most, if not all, of the seed protectants in commercial use have marked fungicidal properties against soil-inhabiting organisms of the type which are known to attack seeds, seedlings, and young plants. However, the lower tetraalkylammonium salts were not previously known to possess fungicidal properties, and in fact in vitro fungicidal tests have failed to disclose fungicidal properties. It may be that the lower tetraalkylammonium salts possess in vivo fungicidal properties, but this has not yet been established. It is also possible that the protectant compounds of this invention function indirectly by stimulating or invigorating the seeds in some way so that their natural resistance to fungicidal attack is increased.

For the purpose of more clearly illustrating the present invention, it is desired to set out the following illustrative examples.

*Example 1*

Tests were conducted to determine the effectiveness of tetramethylammonium bromide, tetramethylammonium chloride, trimethylethylammonium chloride and tetraethylammonium bromide as seed protectants. Tests were conducted so as to obtain a comparison not only between these compounds and untreated seeds, but also between these compounds and seeds treated with a standard commercial seed protectant, viz. tetrachloro-p-benzoquinone. The chemicals were formulated into 25% dusts using Pyrax, ABB as a diluent. Moistened seeds were rolled in each dust until throughly coated, and then planted in unsterile greenhouse soil in flat boxes. Observation of seedling emergence was made when emergence was complete. The chemicals were coded as follows:

D1—Tetramethylammonium bromide
D2—Tetramethylammonium chloride
D3—Trimethylethylammonium chloride
D4—Tetraethylammonium bromide
Sd.—86% tetrachloro-p-benzoquinone
Ck.—Check (untreated)

| Code No. | Percent Conc. | Crop | Variety | 8 Days | | | End of Period | | |
|---|---|---|---|---|---|---|---|---|---|
| | | | | Percent Emerged | Percent Emerged D. O.[1] | Net Percent Healthy Plants | Percent Emerged | Percent Emerged D. O.[1] | Net Percent Healthy Plants |
| D 1 | 25.0 | Celery | Giant Pascal. | Not Recorded. | Not Recorded. | Not Recorded. | 66.0 | 0.0 | 66.0 |
| D 2 | 25.0 | | | | | | 66.0 | 6.0 | 60.0 |
| D 3 | 25.0 | | | | | | 36.0 | 0.0 | 36.0 |
| Sd | 100.0 | | | | | | 62.0 | 2.0 | 60.0 |
| Ck | 0.0 | | | | | | 4.0 | 0.0 | 4.0 |
| D 1 | 25.0 | Tomato | Pritchard | 54.0 | 0.0 | 54.0 | 92.0 | 2.0 | 90.0 |
| D 2 | 25.0 | | | 36.0 | 0.0 | 36.0 | 78.0 | 0.0 | 78.0 |
| D 3 | 25.0 | | | 22.0 | 0.0 | 22.0 | 72.0 | 2.0 | 70.0 |
| Sd | 100.0 | | | 2.0 | 0.0 | 2.0 | 74.0 | 2.0 | 72.0 |
| Ck | 0.0 | | | 16.0 | 0.0 | 16.0 | 82.0 | 0.0 | 82.0 |
| D 1 | 25.0 | Lettuce | Iceberg | 66.0 | 0.0 | 66.0 | 76.0 | 2.0 | 74.0 |
| D 2 | 25.0 | | | 64.0 | 0.0 | 64.0 | 78.0 | 2.0 | 76.0 |
| D 3 | 25.0 | | | 60.0 | 0.0 | 60.0 | 72.0 | 0.0 | 72.0 |
| Sd | 100.0 | | | 14.0 | 0.0 | 14.0 | 72.0 | 2.0 | 70.0 |
| Ck | 0.0 | | | 28.0 | 0.0 | 28.0 | 30.0 | 0.0 | 30.0 |
| D 1 | 25.0 | Millet | Japanese | Not Recorded. | Not Recorded. | Not Recorded. | 76.0 | 0.0 | 76.0 |
| D 2 | 25.0 | | | | | | 88.0 | 0.0 | 88.0 |
| D 3 | 25.0 | | | | | | 80.0 | 0.0 | 80.0 |
| D 4 | 25.0 | | | | | | 78.0 | 0.0 | 78.0 |
| Sd | 100.0 | | | | | | 92.0 | 0.0 | 92.0 |
| Ck | 0.0 | | | | | | 78.0 | 0.0 | 78.0 |

[1] Damping off.

Example II

Substantially the same procedure was followed as in Example I in testing the following chemicals. 100 seeds were treated by atomizing water on them with a small spray nozzle and then adding the dust to thoroughly coat the seeds. Observations of seedling emergence were made when emergency was complete. The chemicals were coded as follows:

D1—Tetramethylammonium bromide
D2—Tetramethylammonium chloride
D3—Trimethylethylammonium chloride
Sd.—86% tetrachloro-p-benzoquinone
Ck.—Untreated check jars. The protectant compounds were added to these jars either as 1 ml. of a 10% water solution thereof, or as .07 gram of the compounds plus 1 ml. of water. The check was made with 1 ml. of water only, and the standard commercial seed protectant was added in a comparable amount as a dust and as a slurry. Immediately after introducing the chemicals, the jars were placed on a ball mill and rotated for 5 minutes. Thereafter, the seeds were dried in the jars for 24 hours. After drying, each jar was placed in a tumbling machine with the jar cap replaced with a wire mesh cap and tumbled for 2 hours.

| Code No. | Percent Conc. | Seed | Variety | Percent Emergence | Percent of Emerged D. O. | Net Percent Healthy Plants |
|---|---|---|---|---|---|---|
| D 1 | 25.0 | Alfalfa | Grimm | 58.0 | 10.4 | 52.0 |
| D 2 | 25.0 | | | 71.0 | 2.8 | 69.0 |
| D 3 | 25.0 | | | 68.0 | 4.4 | 65.0 |
| Sd | 100.0 | | | 44.0 | 9.1 | 40.0 |
| Ck | 0.0 | | | 46.0 | 17.3 | 38.0 |
| D 1 | 25.0 | Beet [1] | Mangel | [1] 171 | 32.1 | [1] 116 |
| D 2 | 25.0 | | | 148 | 23.6 | 113 |
| D 3 | 25.0 | | | 161 | 14.3 | 138 |
| Sd | 100.0 | | | 55 | 78.3 | 12 |
| Ck | 0.0 | | | 65 | 44.6 | 36 |
| D 1 | 25.0 | Cantaloupe | Hales Best | 49.0 | 28.6 | 35.0 |
| D 2 | 25.0 | | | 81.0 | 6.1 | 76.0 |
| D 3 | 25.0 | | | 64.0 | 18.7 | 52.0 |
| Sd | 100.0 | | | 53.0 | 20.8 | 42.0 |
| Ck | 0.0 | | | 18.0 | 27.8 | 13.0 |

[1] Beet—Multiple seeds which produce many seedlings—actual numbers and not percentages given.

Example III

The procedures of Examples I and II were followed in further testing of the protectant compounds. The chemicals employed in these tests were coded as follows:

D1—Tetramethylammonmium bromide
D2—Tetramethylammonium chloride
D3—Trimethylethylammonium chloride
Sd.—86% tetrachloro-p-benzoquinone
Ck.—Untreated check A duplicate series was prepared, rotated on the ball mill for 5 minutes, and dried but not tumbled. All seeds were planted in moist infected greenhouse soil, and observed for seedling emergence at 12 days. The chemicals were coded as follows:

D1—Tetramethylammonium bromide
D2—Tetramethylammonium chloride

| Code No. | Percent Conc. | No. Seeds | Seed | Variety | Percent Emergence | Percent of Emerged D. O. | Net Percent Healthy Plants |
|---|---|---|---|---|---|---|---|
| D 1 | 25.0 | 100 | Carrot | Danvers Half Long. | 83.0 | 9.6 | 75.0 |
| D 2 | 25.0 | | | | 83.0 | 1.2 | 82.0 |
| D 3 | 25.0 | | | | 71.0 | 0.0 | 71.0 |
| Sd | 100.0 | | | | 71.0 | 7.1 | 65.0 |
| Ck | 0.0 | | | | 65.0 | 3.1 | 63.0 |
| D 1 | 25.0 | 100 | Clover | Ladino | 49.0 | 2.0 | 65.0 |
| D 2 | 25.0 | | | | 47.0 | 0.0 | 47.0 |
| D 3 | 25.0 | | | | 57.0 | 0.0 | 57.0 |
| Sd | 100.0 | | | | 9.0 | 0.0 | 9.0 |
| Ck | 0.0 | | | | 54.0 | 3.7 | 52.0 |
| D 1 | 25.0 | 50 | Radish. | Early Scarlet Globe. | 94.0 | 0.0 | 94.0 |
| D 2 | 25.0 | | | | 96.0 | 0.0 | 96.0 |
| D 3 | 25.0 | | | | 88.0 | 0.0 | 88.0 |
| Sd | 100.0 | | | | 90.0 | 4.4 | 86.0 |
| Ck | 0.0 | | | | 90.0 | 0.0 | 90.0 |

Example IV

Twenty-nine grams of pea seeds (approximately 106 to 107 seeds), were weighed in each of nine seed-treating D3—Trimethylethylammonium chloride
Sd.—86% tetrachloro-p-benzoquinone
Sd.-Sl.—Aqueous slurry tetrachloro-p-benzoquinone
Ck.—Check

| Material | Percent Concentration | Tumbled | Percent Emerged | Percent Healthy Plants | Average Net Percent Healthy Plants |
|---|---|---|---|---|---|
| D 1 | 1.0 ml. of 10.0% solution | Not tumbled | 60 | 58 | 64 |
|  | do | do | 72 | 70 |  |
|  | do | Tumbled | 66 | 66 | 70 |
|  | do | do | 74 | 74 |  |
| D 2 | 1.0 ml. of 10.0% solution | Not tumbled | 80 | 76 | 75 |
|  | do | do | 74 | 74 |  |
|  | do | Tumbled | 72 | 72 | 76 |
|  | do | do | 80 | 80 |  |
| D 3 | 1.0 ml. of 10.0% solution | Not tumbled | 50 | 46 | 46 |
|  | do | do | 48 | 46 |  |
|  | do | Tumbled | 74 | 74 | 70 |
|  | do | do | 72 | 66 |  |
| D 1 | 0.07 gram +1.0 ml. water | Not tumbled | 58 | 52 | 48 |
|  | do | do | 48 | 44 |  |
|  | do | Tumbled | 66 | 66 | 66 |
|  | do | do | 70 | 66 |  |
| D 2 | 0.07 gram +1.0 ml. water | Not tumbled | 68 | 62 | 58 |
|  | do | do | 54 | 54 |  |
|  | do | Tumbled | 80 | 80 | 83 |
|  | do | do | 86 | 86 |  |
| Sd. (Dry) | 0.07 gram | Not tumbled | 34 | 32 | 28 |
|  | do | do | 26 | 24 |  |
|  | do | Tumbled | 64 | 64 | 51 |
|  | do | do | 48 | 48 |  |
| Sd. Sl | 0.07 gram +1.0 ml. water | Not tumbled | 48 | 48 | 38 |
|  | do | do | 30 | 28 |  |
|  | do | Tumbled | 78 | 78 | 65 |
|  | do | do | 52 | 52 |  |
| Ck | 1.0 ml. water | Not tumbled | 8 | 8 | 9 |
|  | do | do | 12 | 10 |  |
|  | do | Tumbled | 10 | 8 | 10 |
|  | do | do | 14 | 12 |  |
| D 3 | 0.07 +1.0 ml. water | Not tumbled | 16 | 16 | 18 |
|  | do | do | 22 | 20 |  |
|  | do | Tumbled | 54 | 54 | 51 |
|  | do | do | 48 | 48 |  |

While in the foregoing specification specific embodiments of the present invention have been set forth in considerable detail for the purpose of illustration, it will be apparent to those skilled in the art that many of the details set forth can be varied widely without departing from the spirit of the invention.

We claim:

1. In a method of increasing the resistance of seeds to attack by soil-inhabiting organisms, the step of treating seeds with a composition containing as its essential active ingredient a tetraalkylammonium halide having less than 5 carbon atoms in each alkyl group.

2. In a method of increasing the resistance of seeds to attack by soil-inhabiting organisms, the step of contacting seeds with an aqueous solution containing as its essential active ingredient a tetraalkylammonium halide having less than 5 carbon atoms in each alkyl group.

3. In a method of increasing the resistance of seeds to attack by soil-inhabiting organisms, the step of treating seeds with a composition containing as its essential active ingredient a tetraalkylammonium halide in admixture with a solid carrier, said halide having less than 5 carbon atoms in each alkyl group.

4. In a method of increasing the resistance of seeds to attack by soil-inhabiting organisms, the step of treating seeds with a composition containing as its essential active ingredient a tetraalkylammonium salt having less than 5 carbon atoms in each alkyl group, said salt being selected from the group consisting of chloride salts and bromide salts.

5. In a method of increasing the resistance of seeds to attack by soil-inhabiting organisms, the step of treating seeds with a composition containing as its essential active ingredient a compound selected from the group consisting of tetramethylammonium halides and trimethylethylammonium halides.

6. In a method of increasing the resistance of seeds to attack by soil-inhabiting organisms, the step of treating seeds with a composition containing as its essential active ingredient a compound selected from the group consisting of tetramethylammonium chloride, tetramethylammonium bromide, trimethylethylammonium chloride and trimethylethylammonium bromide.

7. In a method of increasing the resistance of seeds to attack by soil-inhabiting organisms, the step of treating seeds with a composition containing as its essential active ingredient tetramethylammonium chloride.

8. In a method of increasing the resistance of seeds to attack by soil-inhabiting organisms, the step of treating seeds with a composition containing as its essential active ingredient trimethylethylammonium chloride.

9. In a method of increasing the resistance of seeds to attack by soil-inhabiting organisms, the steps of treating seeds with a composition containing as its essential active ingredient a tetraalkylammonium halide having less than 5 carbon atoms in each alkyl group, and tumbling said treated seeds.

10. In a method of increasing the resistance of seeds to attack by soil-inhabiting organisms, the steps of contacting seeds with an aqueous solution containing as its essential active ingredient a tetraalkylammonium halide having less than 5 carbon atoms in each alkyl group, and tumbling said seeds.

11. In a method of increasing the resistance of seeds to attack by soil-inhabiting organisms, the step of contacting seeds with a tetramethylammonium halide dispersed in a bentonite clay, said halide having less than 5 carbon atoms in each alkyl group, said halide constituting the essential active ingredient in the composition.

References Cited in the file of this patent

UNITED STATES PATENTS

| | | |
|---|---|---|
| 2,309,592 | Hueter | Jan. 26, 1943 |
| 2,494,941 | Goll | Jan. 17, 1950 |
| 2,519,924 | Nowak | Aug. 22, 1950 |
| 2,541,248 | Hibbs | Feb. 13, 1951 |